United States Patent
Macchi et al.

(10) Patent No.: US 10,167,135 B2
(45) Date of Patent: Jan. 1, 2019

(54) SINGLE-PORTION PACKAGE, SYSTEM AND PROCESS FOR PREPARING LIQUID PRODUCTS BASED UPON SAID SINGLE-PORTION PACKAGES

(71) Applicant: MITACA S.r.l., Robecchetto con Induno (IT)

(72) Inventors: Edoardo Macchi, Ossona (IT); Francesco Minerba, Legnano (IT)

(73) Assignee: MITACA S.r.l., Robecchetto con Induno (MI) (IT)

( * ) Notice: Subject to any disclaimer, the term of this patent is extended or adjusted under 35 U.S.C. 154(b) by 0 days.

(21) Appl. No.: 15/032,316

(22) PCT Filed: Oct. 16, 2014

(86) PCT No.: PCT/EP2014/002798
§ 371 (c)(1),
(2) Date: Apr. 27, 2016

(87) PCT Pub. No.: WO2015/062703
PCT Pub. Date: May 7, 2015

(65) Prior Publication Data
US 2016/0251150 A1    Sep. 1, 2016

(30) Foreign Application Priority Data

Oct. 29, 2013   (EP) .................................. EP13005130

(51) Int. Cl.
*B65D 85/804* (2006.01)
*B65D 21/08* (2006.01)
*A23F 5/26* (2006.01)

(52) U.S. Cl.
CPC .......... *B65D 85/8043* (2013.01); *A23F 5/262* (2013.01); *B65D 21/086* (2013.01)

(58) Field of Classification Search
CPC .................................................. B65D 85/8043
See application file for complete search history.

(56) References Cited

U.S. PATENT DOCUMENTS

| | | | |
|---|---|---|---|
| 2007/0148290 A1 | 6/2007 | Ternite et al. | |
| 2009/0007793 A1* | 1/2009 | Glucksman | B65D 85/8043 99/287 |
| 2009/0211458 A1 | 8/2009 | Denisart et al. | |

FOREIGN PATENT DOCUMENTS

| | | |
|---|---|---|
| DE | 102004056224 | 5/2006 |
| DE | 202005021174 | 6/2007 |

(Continued)

OTHER PUBLICATIONS

International Search Report and the Written Opinion dated Nov. 21, 2014 From the International Searching Authority Re. Application No. PCT/EP2014/002798.

*Primary Examiner* — Erik Kashnikow
*Assistant Examiner* — Chaim A Smith

(57) ABSTRACT

The present invention discloses a single-portion package (1) presenting a flow distribution element (4) provided so as to divide the internal volume into a first free space (1.1) and a second compartment (1.2) containing at least one substance, and whereby said flow distribution element (4) is displaced along successive positions along and relative to the sidewall (3.1) under the fluid pressure developing on said first space (1.1), and so that it initially confines said substance and it then confines and/or compresses said substance. The present invention further relates to a system (10) for preparing liquid products and comprising at least two of said single-portion packages (1, 1') preferentially presenting different flow distribution elements (4, 4') so that it results for example in different first spaces (1.1, 1.1') and respective compartments (1.2, 1.2').

6 Claims, 5 Drawing Sheets

(56) References Cited

FOREIGN PATENT DOCUMENTS

| EP | 2284102 | 2/2011 |
|---|---|---|
| WO | WO 2009/006374 | 1/2009 |
| WO | WO 2015/062703 | 5/2015 |

* cited by examiner

SINGLE-PORTION PACKAGE, SYSTEM AND PROCESS FOR PREPARING LIQUID PRODUCTS BASED UPON SAID SINGLE-PORTION PACKAGES

RELATED APPLICATIONS

This application is a National Phase of PCT Patent Application No. PCT/EP2014/002798 having International filing date of Oct. 16, 2014, which claims the benefit of priority of European Patent Application No. EP13005130 filed on Oct. 29, 2013. The contents of the above applications are all incorporated by reference as if fully set forth herein in their entirety.

FIELD AND BACKGROUND OF THE INVENTION

The present invention refers to single-portion packages for preparing liquid products. At least some embodiments of the present invention refer to single-portion packages for preparing aromatic beverages such as espresso coffee and similar.

The present invention further relates to a system of single-portion packages adapted for different liquid products and to a process of using said system for the preparation of liquid products, in particular aromatic beverages such as espresso coffee and similar.

It is known to prepare liquid products, including aromatic beverages, by means of providing a respective precursor edible substance inside a single-portion package, including in the form of a substantially rigid capsule or of a substantially flexible pod.

The WO 2010/115970 A1 and WO 2010/139575 A1 disclose single-portion packages of the aforementioned type, presenting a structural envelope in the form of a lid part and a respective container part together defining an internal volume for receiving an edible substance and adapted to be traversed by a pressurized flow flowing from an entry side to an exit side disposed in direct opposing surfaces of said internal volume.

The GB 899,055 and EP 1344722 B1 disclose single-portion packages of this type and comprising an internal flow distribution element, either flexible or rigid, arranged so as to divide said internal volume into a free space upstream thereof and a compartment for the at least one edible precursor substance underneath. Said flow distribution element is provided at a certain position within said internal volume, thereby confining the loose portion of edible substance so as to prevent that in case of a smaller quantity thereof, it results in an oblique surface thereof facing the upstream fluid flow when disposed inside a respective extraction device. Moreover, said flow distribution elements present a plurality of flow passageways meant to uniformly distribute the pressurized fluid flow and to reduce the flow velocity over the top surface of the edible substance underneath. In particular, the EP 1344722 B1 discloses a flow distribution element retained in a fixed engagement simultaneously with the sidewall and with a shoulder element at a distance from the base wall and the coverlid.

The EP 1784 344 B1 discloses a single-portion package only differing from its prior art in that said flow distribution element is arranged at a certain position within said internal volume in order not to confine, but rather to keep the bed of substance in compression in the non hydrated-state of the substance. Moreover, it discloses a method for manufacturing a capsule whereby the flow distribution element is placed transversal to the hollow body and welded to the internal side of the hollow body and at a distance from the injection wall.

Prior art thus includes elements with a flow distribution function across the entire cross-section of the package and provided in a single position thereby either confining or compressing the substance underneath. In particular in the case of non-compacted granular edible substances, it would be advantageous to the overall beverage extraction efficacy, to have a confinement of the edible substance previous to the injection (so-called dry state) and to have said compression at the time of the injection of the pressurized fluid flow into the chamber containing the edible substance. Moreover, it would be desirable to have the possibility of adjusting these successive conditions within a given internal volume according to different types of edible substances and respective types of liquid products being produced based thereupon.

It is therefore an object of the present invention to provide for a simple and effective distribution of fluid flow inside a single-portion package together with the possibility of an effective confinement and compression of the edible substance stored inside thereof.

Moreover, it is a further object of the present invention to provide for a system for preparing different liquid products that is more effective in technical and economic terms, including in terms of its production and assembly.

SUMMARY OF THE INVENTION

The goal of the present invention is to provide a single-portion package, such as a capsule, including a disc-like flow distribution element arranged in such an interaction with the edible substance underneath so as to provide confinement when in a dry-state, and to provide confinement and/or compression when actuated by a pressurized fluid flow, i.e. at least initially or partially in a wet-state, as required for the preparation of a particular beverage.

This goal is attained by the present invention by means of a single-portion package according to independent claim 1, whereby preferred embodiments are henceforth disclosed in its dependent claims.

According to claim 1, it is provided a single-portion package for preparing a liquid product, comprising a top wall, a side wall and a base wall together defining an internal volume within which there is disposed a flow distribution element, provided in the general form of disc-like circumferential element with a plurality of spaced flow passageways, so as to divide said internal volume into a first free space next to said top wall for receiving a fluid to be distributed by means of said flow distribution element, and a second compartment space for storing at least one substance to be extracted by means of said fluid flowing through and being distributed by said flow distribution element, whereby said flow distribution element presents an outer peripheral portion that, depending on a defined liquid pressure acting in said first space upon said flow distribution element, is movably retained in different positions with reference to and along said sidewall in a piston-like manner.

According to a preferred embodiment, said flow distribution element is driven downstream along the prevailing flow direction from an initial position to a second, fixed position. In this sense, said peripheral portion of said flow distribution element is adapted so as to be movably retained at least in a region of said sidewall including a first distance relative to the base wall, and preferentially also including a smaller distance relative to the base wall, preferentially by means of a pressure-fit interaction, preferentially at least liquid tight, between at least part of said peripheral portion with the side wall, thereby confining preferentially without compressing said substance stored in said second space. Moreover, said peripheral portion is adapted so as to be fixedly retained along said sidewall when at a second position at said smaller distance relative to the base wall, thereby confining and/or at least partially compressing said substance in said second space. In particular if said substance is of granular nature and provided in a substantially uncompressed condition, this advantageously provides the possibility of initially confining the substance, avoiding, and compressing it if and when really required, i.e. somewhat simultaneously with the pressurized flow injection into the single-portion package.

According to an associated goal, said single-portion package and its flow distribution element are provided with simple, i.e. of reduced manufacturing requirements, and effective means to carry out the aforementioned movement.

According to another preferred embodiment, said peripheral portion is provided with a side engagement portion preferentially configured to form a shoulder projection, or similar form, extending along at least part of the outer extension of the flow distribution element and with a preferentially higher thickness along at least part of its extension relative to the rest of said peripheral portion, for interacting in a movable pressure-fit manner with said sidewall at least in the region including said distances relative to the base wall.

Moreover, said peripheral portion of the flow distribution element might be adapted to be retained at said second distance by means of support of at least part thereof, preferentially the downstream face of said side engagement portion, upon a plurality of retaining elements provided in the internal side of said sidewall It is further preferred when said peripheral portion further presents a peripheral engagement extension, adapted to engage with said retaining elements, preferentially in a form-fit manner.

According to another preferred aspect, said retaining elements are configured as projections on the inside surface of the sidewall of the single-portion package adapted to engage with at least part of the peripheral portion of the flow distribution element, whereby said retaining elements are preferentially uniformly distributed along the inside perimeter of said inside surface of the sidewall.

According to another preferred aspect, said peripheral portion of the flow distribution element projects from a central portion thereof and is disposed oriented upstream or downstream, preferentially so that a resulting cavity is oriented upstream.

Another preferred embodiment allows providing a solution for a first or second compression stage of said substance, including as a function of the fluid pressure developed thereupon, i.e. upon said flow distribution element.

This might be achieved by means of a flow distribution element presenting a bending portion, preferentially in the proximity of its peripheral portion and provided in a downstream oriented deflection configuration or in a groove-like configuration, adapted so as to deflect in elastic or elasto-plastic deformation under upstream fluid flow pressure, so that at least part of the central portion deflects thereby extending its height to a bigger height and thereby preferentially compressing said substance stored in said second space.

According to another preferred aspect, said flow distribution element presents flow passageways in its central portion and preferentially also in the region between peripheral portion and bending portion, whereby the respective number, distribution and dimension is defined as a function of parameters including the fluid pressure generated in said first space and the type of substance in said second space.

According to a preferred embodiment, said flow distribution element is provided in a composite material of regular thickness in the central portion thereof.

According to another preferred embodiment, said flow distribution element is arranged so that the fluid pressure required for displacing it from said first to said second positions is different from the fluid pressure required to deflect at least part of its central portion relative to the rest of the flow distribution element.

According to another preferred embodiment, said single-portion package is provided as a single-piece or as multiple pieces, preferentially including lid part including said top wall and a container part including said sidewall and said base wall.

As already mentioned above, it is another object of the present invention to provide a system of single-portion packages that can produce different types of liquid products according to different preparation parameters, with the least changes in the package itself.

This object is achieved by means of a system of single-portion packages according to independent claim 9, whereby preferred embodiments are disclosed in its dependent claims.

According to claim 9, there is provided a system for preparation of liquid products, comprising at least one machine including at least one extraction device adapted to provide a pressurized fluid flow to a single-use package, and comprising at least two single-use packages, especially single-use packages according to the present invention, whereby there are provided at least two groups of different single-use packages each of said groups including at least one single-use package, preferably a plurality of single-use packages, whereby said single-use packages in said different groups differ from each other by means of different flow distribution elements and/or by means of a retention of a flow distribution element at respectively different positions along and relative to said sidewall. In such embodiments the rest of the single-use packages might be identical.

According to a preferred aspect, said flow distribution elements present a different outer diameter so that they provided at different first positions including respective different distances relative to the base wall of respective single-use packages. Moreover, said different flow distribution elements present flow passageways that differ in at least one parameter including their number, distribution and dimension.

According to another preferred aspect, each of said groups of single-use packages is adapted according to liquid production parameters including type of beverage, quantity of beverage, amount of foam in beverage to be produced in respective single-use packages.

Another object of the present invention is to provide a process for the preparation of liquid products in a system including such single-portion packages.

This object is achieved by means of a process according to independent claim 12, whereby preferred embodiments are disclosed in respective dependent claims.

According to claim 12, there is provided a process for preparing a liquid product, comprising the steps of: providing a machine including at least one extraction device adapted for providing a pressurized fluid flow to a single-portion package and collecting the resulting liquid product resulting therefrom; providing a single-portion package to said extraction group, whereby this presents a flow distribution element disposed so as to divide its interior into a first space provided free and a downstream second space containing at least one substance; actuating the machine so that pressurized fluid flow, such as a pressurized water flow, is provided to said single-portion package, whereby said fluid flow enters into said first space thereby displacing the flow distribution element from about a first position at a first distance to a second position at a second smaller distance relative to the base wall.

According to a preferred aspect, said pressurized fluid flow is provided in at least one location of said top wall thereby initially accumulating in said first space between the later and said flow distribution element, thereby exerting pressure thereupon.

According to another preferred aspect, after said flow distribution element is retained at said second position corresponding to a smaller distance relative to the base wall, the central portion thereof increases its height relative to a most upstream portion of said flow distribution element, to a higher height, thereby compressing the edible substance underneath.

According to another preferred aspect, said actuation of the machine for preparation of liquid products includes at least one information parameter including relating to the type of beverage and the type or relative position of a respective flow distribution element.

BRIEF DESCRIPTION OF THE SEVERAL VIEWS OF THE DRAWINGS

The invention shall now be described in more detail with support of the figures attached including schematic representations of preferred embodiments. These show.

DESCRIPTION OF SPECIFIC EMBODIMENTS OF THE INVENTION

Figure 1:
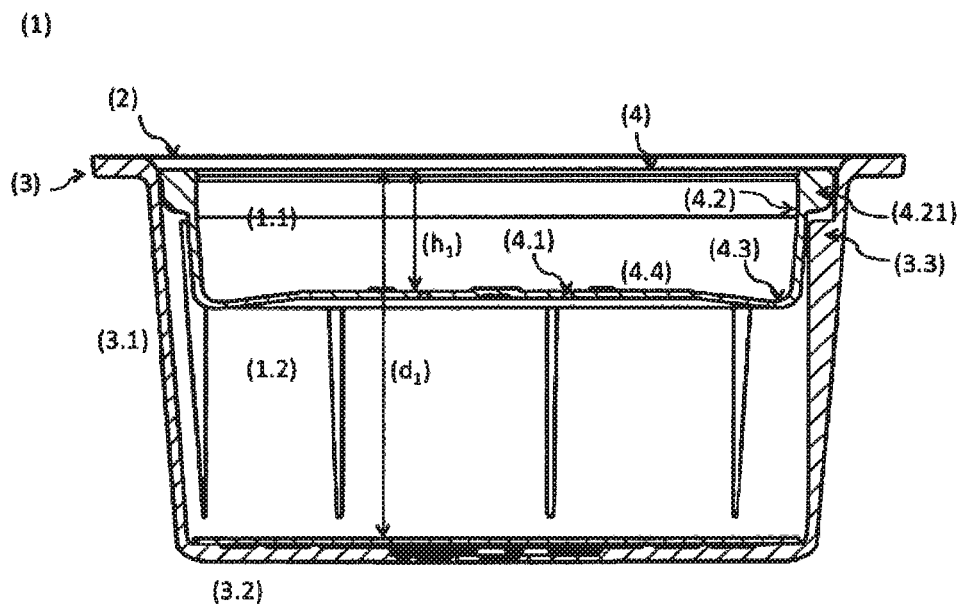
FIG. 1: side cut view of a first embodiment of a single-portion package (1) according to the invention, and presenting a flow distribution element (4) retained in a first position.
Figure 2:
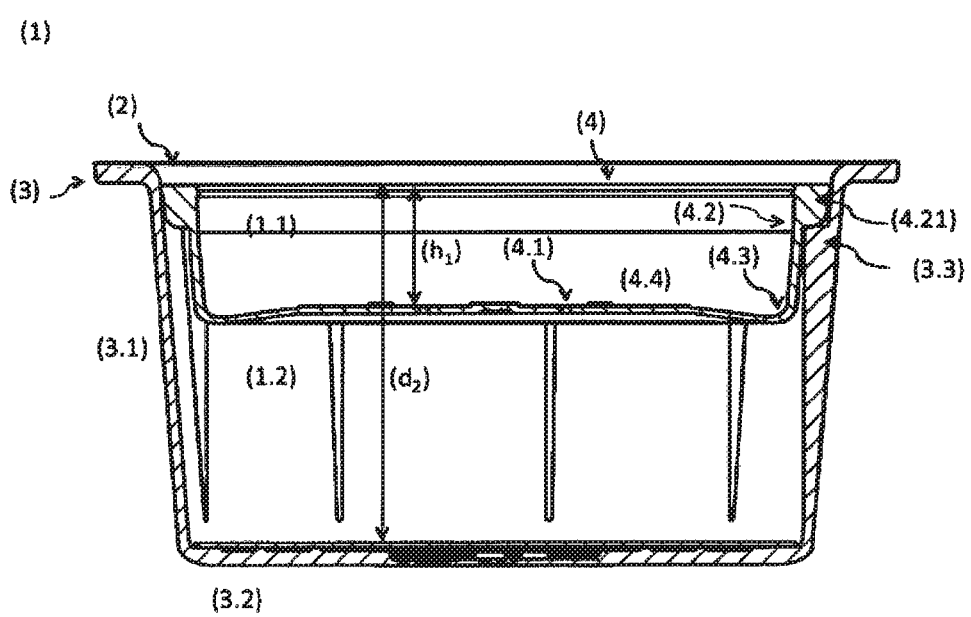
FIG. 2: side cut view of the first embodiment of a single-portion package (1) according to FIG. 1, and presenting a flow distribution element (4) retained in a second position.
Figure 3:
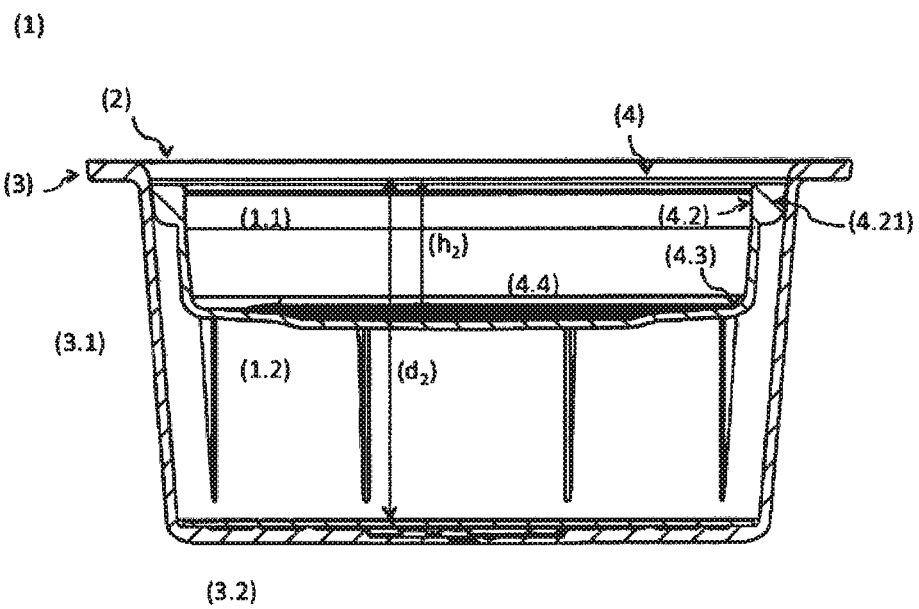
FIG. 3: side cut view of the first embodiment of a single-portion package (1) according to FIG. 1, and presenting a flow distribution element (4) retained in said second position according to FIG. 2 and at least partially further deflected downstream.

FIGS. 1, 2 and 3 schematically represent a first preferred embodiment of a single-portion package (1) for preparing a liquid product, such as for example espresso coffee or similar aromatic beverages, according to the present invention. The single-portion package (1) comprises a top wall (2), a sidewall (3.1) and a base wall (3.2), together defining an internal volume and presenting a flow distribution element (4). In a preferred embodiment, there is provided a lid part comprising said top wall (2) and a container part (3) comprising said sidewall (3.1) and base wall (3.2). The flow distribution element (4) is provided as a substantially circumferential disc-like element presenting a plurality of flow passageways (4.1) and disposed so as to divide said internal volume into an internal first free space (1.1) next to the top wall (2) and a second compartment space (1.2) downstream thereof, for storing at least one edible substance.

According to a first inventive aspect, said flow distribution element (4) is not disposed in a single fixed position, but rather is arranged to be movably retained in different, at least two successive positions along and relative to the internal face of said sidewall (3.1). This advantageously combines the functions of confinement and compression of the edible substance, as required by the type of beverage to be produced and during its method of preparation.

In particular, as it can be seen in FIG. 1, the flow distribution element (4) is initially disposed at a first position at a distance ($d_1$) relative to the base wall (3.2), so that it confines the substance underneath without compressing it. In this first position, the flow distribution element (4) is retained by means of a pressure-fit engagement with the sidewall (3.1). This engagement is adapted so that it can be displaced, preferentially under increasing resistance from the increasing tapering of sidewall (3.1), towards the base wall (3.2) as a result of the pressurized fluid flow impinging it upstream. This advantageously provides for a confinement of the at least partially loose or not substantially compressed edible substance, thereby avoiding resulting in an oblique top surface thereof when inside a respective extraction device of a machine for preparing liquid products.

As it further results from FIG. 1, in the case of this first embodiment, said flow distribution element (4) provides a first space (1.1) along the prevailing flow direction, of relatively large free volume at least extending over most of the cross section of the container part (3) and over a height ($h_1$) thereof. Moreover, said flow distribution element (4) presents a peripheral part (4.2) for engaging in pressure-fit manner, preferentially in liquid tight manner, with the sidewall (3.1) including as result of substantially similar respective diameter dimensions. In particular, it is preferred when said peripheral part (4.2) presents a side engagement portion (4.21) configured as a shoulder and adapted to engage with the sidewall (3.1) and with retaining elements (3.3).

This type of retention advantageously reduces the production costs associated with fixating the flow distribution element (4), for example by means of welding, to the internal face of the sidewall (3.1).

According to another inventive aspect and as it results from FIG. 2, once the pressurized fluid flow is provided inside the single-portion package (1), the flow distribution element (4) is displaced from its initial position to a second position at a smaller distance ($d_2$) relative to the base wall (3.2). In this second position, the flow distribution element (4) is arranged so as to confine and/or at least partially compress the edible substance downstream thereof. As indicated, the central portion (4.4) is in the same distended position at a first height ($h_1$) from the most upstream part of the flow distribution element (4) and in the proximity from or engaging with the edible substance (not represented). Therefore, an actual compression of the substance only takes place after injection of the pressurized fluid flow.

According to another inventive aspect, the flow distribution element (4) is retained in this second position by means of retaining elements (3.3) provided on the internal face of the sidewall (3.1). In a preferred embodiment, these retaining elements (3.3) are uniformly distributed along the perimeter of the internal sidewall (3.1) as triangular projections configured so as to provide a supporting horizontal side at said distance ($d_2$) from the base wall (3.2). This configuration of the retaining elements (3.3) advantageously avoids any substantial change of the internal cross-section of the single-portion package (1).

As represented in FIG. 3, the flow distribution element (4) is adapted so that in a following moment and under further fluid pressure upstream, it deflects at least in a central portion (4.4) thereof, thereby further confining and/or compressing the edible substance in the space (1.2) underneath. As indicated, at least part of said central portion (4.4) is now at a larger distance ($d_2$) from the top of the flow distribution element (4). Therefore, an actual compression of the substance only takes place after injection of the pressurized fluid flow.

Figure 4:
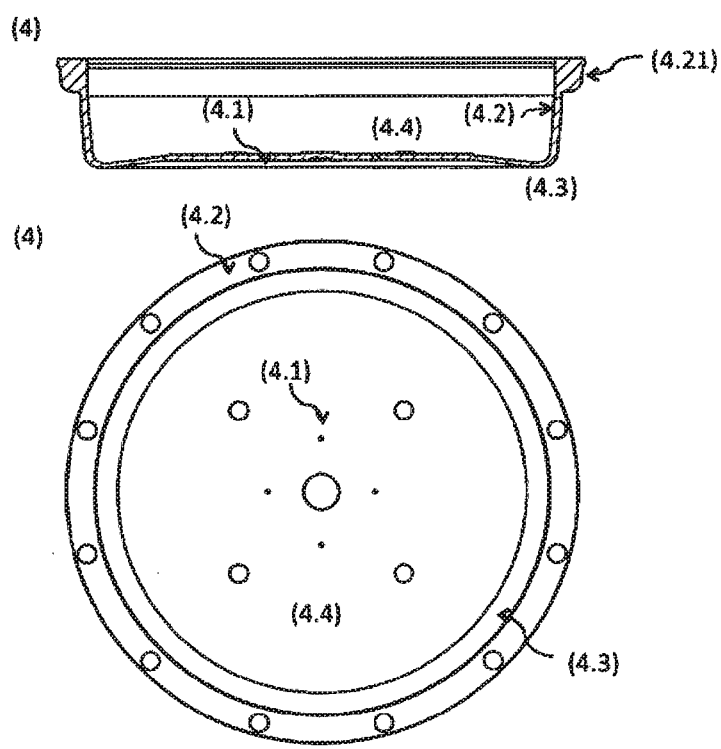
FIG. 4: side cut view (top) and plan view (bottom) of a first embodiment of a flow distribution element (4) for use in a single-portion package (1) according to the invention.

FIG. 4 represents the flow distribution element (4) according to FIGS. 1, 2 and 3 in more detail. According to another inventive aspect, said first embodiment of the flow distribution element (4) presents a peripheral portion (4.2) projecting from the central portion (4.4) thereof. This peripheral portion (4.2) is adapted to provide for the pressure-fit, preferentially liquid tight, interaction with the sidewall (3.1).

As further represented (see cut view in the top representation), the peripheral portion (4.2) is preferentially oriented upstream and preferentially presenting a side engagement portion (4.21) provided along at least part of the sidewall extension thereof and configured in a shoulder-like form, to better engage in respective retaining elements (3.3) provided in the internal face of the sidewall (3.1).

According to another aspect, the flow distribution element (4) is further provided with a bending portion (4.3) between said central portion (4.4) and said peripheral portion (4.2) and in the proximity of the latter. In this embodiment, this bending portion (4.3) is configured as a downstream oriented deflection configuration and adapted so as to deflect in elastic or elastoplastic deformation under upstream fluid flow pressure exerted by the fluid accumulating in the first space (1.1), so that at least part of the central portion (4.4) may deflect further than the bending portion (4.3).

Moreover, as best represented in the top view (bottom representation) of FIG. 4, the distribution element (4) presents a plurality of flow passageways (4.1) in its central portion (4.4).

According to a further aspect said flow distribution element (4) is adapted so that the pressure required to displace it from said first to said second positions—i.e., from about a first height $h_1$ to a smaller height $h_2$ relative to a most upstream portion—is different from the pressure required to deflect at least part of its central portion (4.4) relative to the rest of the flow distribution element (4)—i.e., from a distended position at a first height $h_1$ to a deflected position at a greater height $h_2$. In preferred embodiments, said flow distribution element (4) presents more flow passageways (4.1) in its central portion (4.4). Moreover, said flow distribution element (4) is provided in a composite material of regular thickness at least in the central portion (4.4) thereof.

Figure 5:
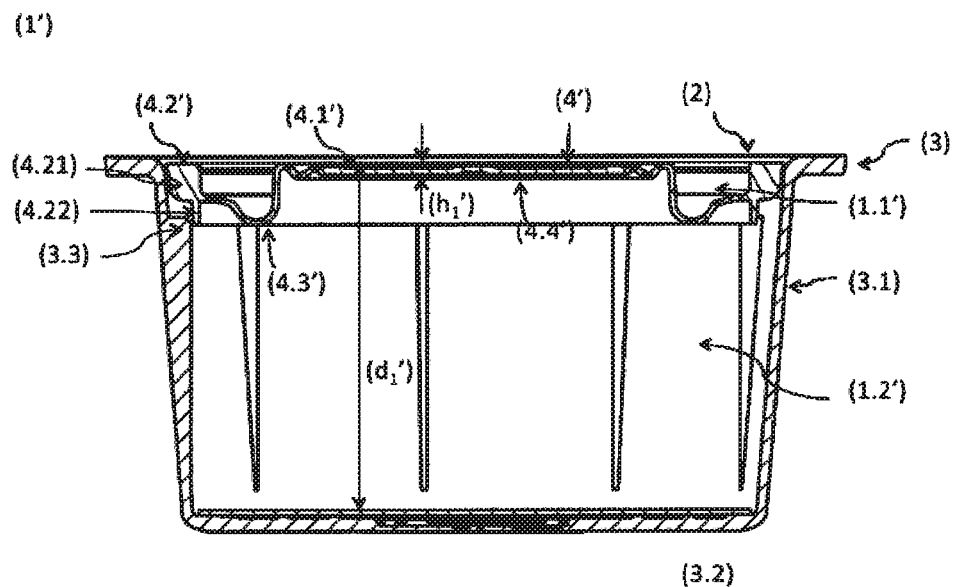
FIG. 5: side cut view of a second embodiment of a single-portion package (1') according to the invention, and presenting a flow distribution element (4') retained in a first position.
Figure 6:
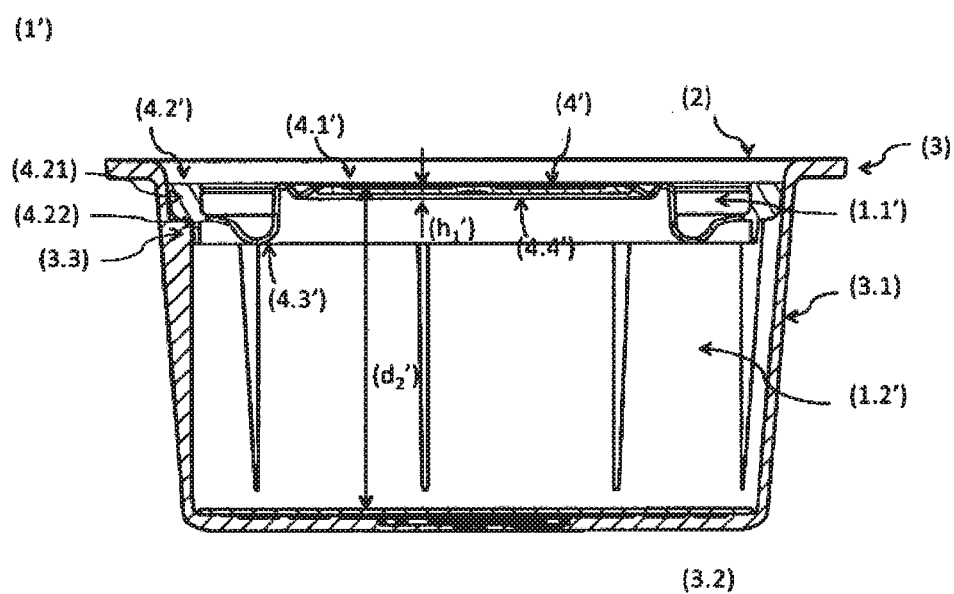
FIG. 6: side cut view of the second embodiment of a single-portion package (1') according to FIG. 5, and presenting a flow distribution element (4') retained in a second position.
Figure 7:
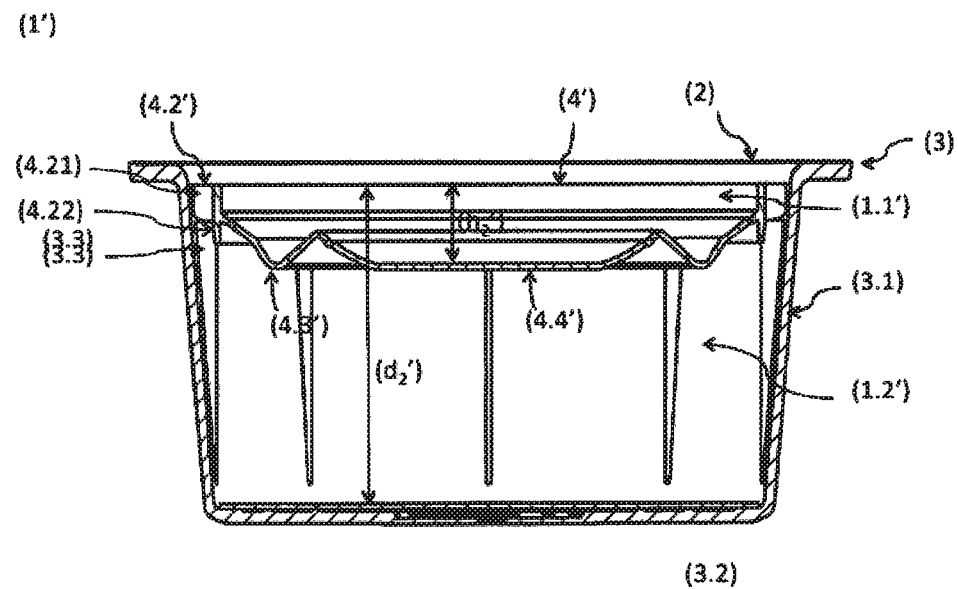
FIG. 7: side cut view of the second embodiment of a single-portion package (1') according to FIG. 5, and presenting a flow distribution element (4') retained in said second position according to FIG. 5 and at least partially further deflected downstream.

FIGS. 5, 6 and 7 represent a second embodiment of a single-portion package (1') according to the present invention, thereby including a different flow distribution element (4'). These representations and the respective reference numbers correspond to those used in FIGS. 1, 2, 3 and 4, thereby only identifying the different components with the respective reference number and an apostrophe signal.

The flow distribution element (4') now presents a different configuration and dimension so that respective retained positions result at different distances ($d_1'$ and $d_2'$) along and relative to the base wall (3.2).

Similarly to the evolution represented in FIGS. 1, 2 and 3, and as depicted in FIGS. 5 and 6, the flow distribution element (4') is initially movably retained in a first position at a distance ($d_1'$) from the base wall (3.2) by means of a pressure-fit engagement of the peripheral portion (4.2') with the sidewall (3.1), and then driven under the fluid pressure of the fluid accumulating in the first free space (1.1') onto a second position at a smaller distance ($d_2'$) relative to the base wall (3.2) where it is retained by means of engagement of said peripheral portion (4.2') in a plurality of retaining elements (3.3) provided as projections along the inside surface of the sidewall (3.1). As in the first embodiment, the flow distribution element (4') advantageously presents a side engagement portion (4.21') adapted to engage in pressure-fit manner with the sidewall (3.1). It is preferred when said peripheral portion (4.2) further presents a peripheral engagement extension (4.22) adapted to also engage preferentially in form-fit manner with said retaining elements (3.3).

As represented, this embodiment of the flow distribution element (4') presents a different configuration whereby it results inside said single-portion package (1) in closer proximity to the top wall (2) and provides a first free space mostly available along the groove-like cavity provided by a respective bending portion (4.3') in the proximity of the peripheral portion (4.2).

FIG. 7 represents the deflection of the central portion (4.4) under further fluid flow pressure, so that it actually at least partially compresses the substance contained stored in said second space (1.2) underneath thereof.

Figure 8:
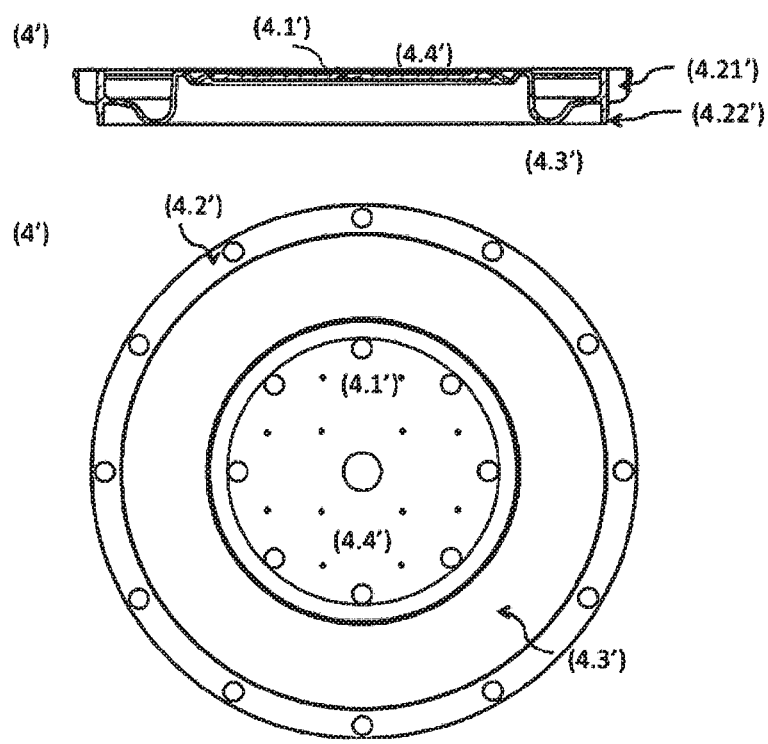
FIG. 8: side cut view (top) and plan view (bottom) of a first embodiment of a flow distribution element (4') for use in a single-portion package (1') according to the invention.

As represented in FIG. 8, in this second embodiment of the flow distribution element (4') there is provided a different distribution of flow passageways (4.1) in its central portion (4.4). A higher overall section of flow passageways are expected to provide for compensation to the smaller first free space (1.1') available for the pressure build-up upon the flow distribution element (4').

In an alternative embodiment (not represented) there are also flow passageways (4.1) provided in its peripheral region between the sidewall (4.2) and bending portion (4.3), whereby the respective number or the total corresponding flow area is similar or different. This may be advantageously used so as to regulate the magnitude and spatial distribution of fluid pressure required to drive the displacement between the successive positions and required to deflect the central portion (4.4). Moreover, such differential configuration and distribution of the flow passageways (4.1) in the central portion (4.4) and eventually also in the peripheral region, may also be advantageously used to determine the flow distribution into the edible substance, including according to the type thereof and type of beverage.

Figure 9:
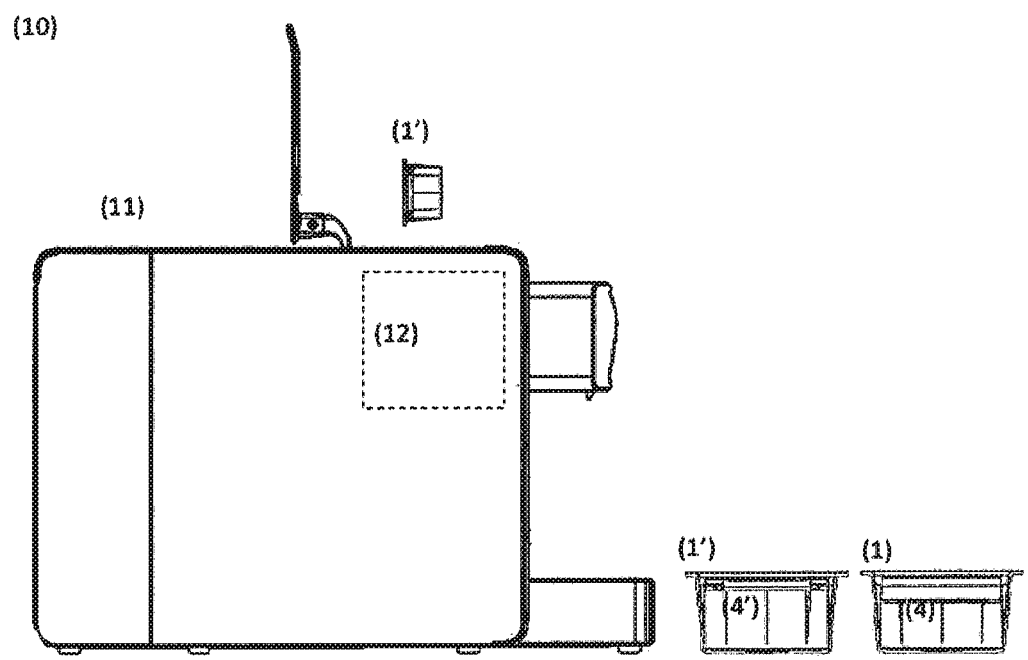
FIG. 9: schematic representation of a system (10) for preparing liquid products according to the invention, and comprising at least two single-portion packages (1,1') including different flow distribution elements (4, 4').

FIG. 9 schematically represents in side view a system (10) for preparing liquid products, in particular aromatic beverages such as espresso coffee and similar. The system (10) according to the present invention includes a machine (11) presenting at least one extraction device (12) adapted to receive a single-portion package (1,1'), provide a pressurized fluid flow to it and collect the beverage resulting therefrom. According to the present invention, this system (10) includes at least two types of single-portion packages (1,1') including different types of edible substances or quantities thereof. In particular, according to an inventive aspect, the single-use packages (1,1') advantageously include respectively different flow distribution elements (4, 4') and/or present retaining elements (3.3) providing retention at respectively different retention positions ($d_1$, $d_1'$ and/or $d_2$, $d_2'$) relative to the base wall (3.2). In the preferred embodiment of providing different flow distribution elements (4, 4'), this allows using the same remaining parts of the single-use portion (1, 1'), in particular the same lid part (2) and container part (3) for preparing different liquid products.

In this respect, according to a preferred embodiment, said flow distribution elements (4, 4') present a different outer diameter so that it is provided at different first positions at respectively different distances ($d_1$, $d_1'$) relative to the base wall (3.2) in respective single-use packages (1, 1'), thereby defining different volumes of the compartment (1.2) available for the edible substance.

Alternatively or complimentary to the above, according to another preferred embodiment, said flow distribution elements (4, 4') present a different number, distribution or dimension of flow passageways (4.1) in respective single-use packages (1, 1'). This may be advantageously used to determine the flow pattern distribution developing downstream of the flow distribution element (4, 4'), in particular as a function of the type of edible substance and of the type of beverage.

In this respect, according to a further preferred embodiment, said flow distribution elements (4, 4') and/or respective distances ($d_1$, $d_2$) relative to the base wall (3.2) are dimensioned according to beverage parameters including type of beverage, quantity of beverage, amount of foam in beverage to be produced.

According to the present invention, a liquid product is thus prepared in an inventive system that includes a machine (11) presenting at least one extraction group (12) adapted for providing a pressurized fluid flow to a single-portion package (1, 1') and collecting the resulting liquid product resulting therefrom, by means of providing a single-portion package (1, 1') to said extraction group (12), actuating the machine (10) so that pressurized fluid flow, such as a pressurized water flow, is provided to said single-portion package (1, 1') and said fluid flow enters into the free space (1.1) thereby displacing the flow distribution element (4) from about a first position at a first distance ($d_1$) to a second position at a second smaller distance ($d_2$) relative to the base wall (3.2).

Moreover, once the pressurized fluid flow is provided in at least one location on a top wall (2) of a single-portion package (4, 4'), it initially accumulates in said free space (1.1) between the later and said flow distribution element (4) thereby exerting pressure thereupon. In particular, as described above, it is advantageous when said flow distribution element (4) is retained at said second position corresponding to a smaller distance ($d_2$) relative to the base wall (3.2), the central portion (4.4) thereof deflecting further thereby compressing the edible substance underneath.

According to a preferred aspect, said actuation of the machine (10) includes at least one information parameter including relating to the type of beverage and relative position of the flow distribution element (4).

What is claimed is:

1. A single-portion package for preparing a liquid product, comprising:
   a top wall, a side wall and a base wall together defining an internal volume within which there is disposed a flow distribution element in the form of a disc-like circumferential element with a plurality of spaced flow passageways so as to divide said internal volume into a first free space next to said top wall for receiving a fluid to be distributed by means of said flow distribution element, and a second compartment space for storing at least one substance to be extracted by means of said fluid flowing through and being distributed by said flow distribution element,
   wherein an outer peripheral portion of said flow distribution element is, depending on a defined liquid pressure acting in said first space upon said flow distribution element, movably retained in different positions with reference to and along said sidewall;
   wherein said peripheral portion of said flow distribution element is adapted so as to be movably retained at least in a region of said sidewall including a first distance relative to the base wall, and also including a smaller distance relative to the base wall by means of a pressure-fit interaction, at least liquid tight, between at least part of said peripheral portion and the side wall, said flow distribution element being initially disposed at a first position at said first distance thereby confining without compressing said substance in said second space;
   wherein said distribution element (4) is provided in a material of regular thickness in the central portion thereof; and
   wherein said peripheral portion is provided with a side engagement portion configured to form a shoulder-like projection extending along at least part of the outer extension of the flow distribution element and with an increased thickness along at least part of its extension relative to the rest of said peripheral portion, for interacting in a movable pressure-fit manner with said sidewall at least in the region including said distances relative to the base wall.

2. The single-portion package according to claim 1, wherein said peripheral portion of said flow distribution element is adapted so as to be fixedly retained along said sidewall when at a second position at said smaller distance relative to the base wall thereby compressing said substance in said second space.

3. The single-portion package according to claim 1, wherein said peripheral portion of the flow distribution element is adapted to be retained at said second distance by means of support of at least part thereof, the downstream face of said side engagement portion, upon a plurality of retaining elements provided in the internal surface of said sidewall.

4. The single-portion package according to claim 3, wherein said retaining elements are configured as projections on the inside surface of the sidewall adapted to engage with at least part of the peripheral portion of the flow distribute on element, whereby said retaining elements uniformly distributed along the inside perimeter of said sidewall.

5. The single-portion package according to claim 1, wherein said flow distribution element presents a bending portion, in the proximity of its peripheral portion and provided in a downstream oriented deflection configuration or in a groove like configuration, adapted so as to deflect in elastic or elastoplastic deformation under upstream fluid flow pressure, so that at least part of said central portion of said flow distribution element deflects, by extending its height relative to an upstream portion thereof to a bigger height and/or by compressing said substance in said second space.

6. The single-portion package according to claim 5, wherein said flow distribution element presents flow passageways in said central portion and also in the region between peripheral portion and bending portion, whereby the respective number, distribution and dimension is defined as a function of parameters including the fluid pressure generated in said first space and the type of substance in said second space.

* * * * *